Patented May 10, 1932

1,857,507

UNITED STATES PATENT OFFICE

KENNETH C. D. HICKMAN AND WALTER J. WEYERTS, OF ROCHESTER, NEW YORK, ASSIGNORS TO EASTMAN KODAK COMPANY, OF ROCHESTER, NEW YORK, A CORPORATION OF NEW YORK

PROCESS FOR THE SEPARATION OF SILVER BY ELECTROLYSIS

No Drawing. Application filed October 22, 1929. Serial No. 401,610.

This invention relates to the electrolytic separation of silver in metallic form from solutions containing it and relates particularly to such a process in which are employed activators that cause the silver to be plated out in coherent form.

There is a generally accepted theory that simple metallic salts separate into component ions when they are dissolved in water. Thus, silver nitrate $AgNO_3$ separates into positive $Ag^+$ ions and negative $NO_3^-$ ions. When two indifferent electrodes are dipped into the salt solution and an electric current is sent through, silver ions are discharged at the negative pole and $NO_3^-$ ions at the positive. Metallic silver is thus deposited at the negative electrode, but at the positive pole the neutralized $NO_3$ ions react with water with the evolution of oxygen and the reformation of nitric acid. It is found, however that the electrolysis of such simple salts does not always produce good adherent deposits of metal and it is customary to employ a complex salt which ionizes in a different manner. The salt of the silver which is generally used for silver plating is the double cyanide of silver and potassium $KAg(CN)_2$ which ionizes thus:

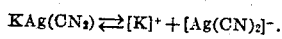

The silver bearing ion migrates to the positive pole where it reacts with water yielding oxygen, cyanate and silver cyanide. The nascent hydrogen which would be liberated as gaseous hydrogen at the cathode reacts with the complex silver ions in the neighborhood and deposits an adherent coating of silver on the cathode.

The industrial use of cyanides is attended with such danger, however, that many attempts have been made to replace them with some non-poisonous complex forming salt. Sodium thiosulfate $Na_2S_2O_3$, well known in photographic practice as a solvent for the silver halides, has been tried, but although it yields a well defined complex silver ion, successful plating has not hitherto been achieved. When a silver halide, such as that forming the light sensitive emulsion upon photographic paper or film, is dissolved by sodium thiosulfate solutions, such as the ordinary photographic fixing bath, there is formed a silver sodium thiosulfate. Some of the emulsion gelatine is also dissolved by the bath.

One of the reasons for this failure to plate is the tendency of silver to form insoluble silver sulfide from all solutions containing available sulfur. Ordinarily, attempts to electrolyze silver sodium thiosulfate solutions have failed owing to the precipitation of silver sulfide at or near the negative electrode. Where photographic development operations of any appreciable extent are conducted, the recovery of the silver which is in solution in the form of a salt in the fixing bath employed is quite an important factor from the standpoint of economical operation. Heretofore, such recovery has been usually accomplished by separating the silver out from the solution containing it in the form of a silver sulfide precipitate or sludge which had to be rather extensively processed to obtain the silver therefrom in metallic form.

It has been known for many years that the addition of small quantities of certain substances will completely alter the nature of an electrolytic deposition action. For example, organic colloids, silicic acid and fluorides sometimes have a powerful beneficial effect in causing more coherent plating.

Our invention relates in general to the discovery of the factors or features which enable silver to be plated from the thiosulfate bath and in particular to a class of compounds termed activators which, when employed, preferably with small amounts of gelatine, enable smooth brilliant deposits of silver to be obtained. It is among the objects of our invention, therefore, to provide a process for the electro-deposition of silver in metallic form from thiosulfate solutions containing it. It is a further object of our invention to provide activators which alter the silver solution in such a way as to make it possible to plate silver therefrom in metallic form. Other objects will be apparent upon a further understanding of this invention.

We have found that a brilliant coating of silver, metallic or semi-metallic in nature, can be obtained from thiosulfate solutions of silver halides when:

(a) The solution contains sulfite,
(b) The solution contains a little free acid,
(c) The solution is vigorously stirred,
(d) The temperature is kept below 15° C., or above 50° C. and below 90° C.,
(e) The current density is kept less than 15 amperes per square foot of cathode surface,
(f) There is present in about 100,000 to 1000 parts of the solution, one part of gelatine or gelatine degradation products,
(g) There is present in about 100,000 to 1000 parts of the solution, one part of certain activators, and/or
(h) The solution is warmed so that the thiosulfate plays the part of the activators hereinafter named.

While it is possible to vary all the factors considerably, (and, in fact, all are not necessary as will be understood from reading this specification) and good plating can sometimes be secured at an unfavorable temperature or sulfite content, careful adjustment of factors (a) to (e) will secure optimum results. When these conditions have been obtained the addition of a comparatively small quantity of gelatine and activator will result in a brilliant coherent deposit of metallic silver. The interplay between gelatine and activator is important for optimum results, although it will be understood that silver may be plated from thiosulfate solutions containing it without gelatine being present, the addition of the activator alone to the solution improving the nature of the deposit.

It is occasionally possible to plate bright silver from solutions adjusted in the above manner with a small quantity of gelatine but no activator; since, however, in an acid solution both the activator and gelatine are deposited at the cathode with the silver, the gelatine equilibrium in the solution is soon upset where no activator is present and the deposit becomes dull and powdery. When an activator is present it is possible to add gelatine in quantities which would otherwise utterly spoil plating and yet secure brilliant deposits. The quantity of activator necessary is roughly dependent on the quantity of gelatine present: more gelatine requires more activator. This power of the activator to activate small concentrations of gelatine and neutralize the harmful action of large quantities is of importance in that it enables platings to be made from photographic fixing baths which are contaminated with uncontrollable quantities of gelatine. The behavior of three typical solutions will illustrate the foregoing.

The solutions all contain:

| | Parts |
|---|---|
| Sodium thiosulfate (crystal) | 2,000 |
| Sodium sulfite (anhydrous) | 300 |
| Acetic acid, glacial | 300 |
| Water, to make | 100,000 |

This solution is divided into ten portions, one of which is saturated with precipitated silver bromide and filtered. The two portions are again mixed and then divided into three portions (Nos. 1–3) for plating.

To 100,000 parts of No. 1 there is added 1 part of gelatine;
To 100,000 parts of No. 2 there is added 5 parts of gelatine and 5 parts of activator;
To 100,000 parts of No. 3 there is added 100 parts of gelatine and 50 parts of activator.

The solutions are vigorously stirred and electrolyzed at 10° C. with a current density of 5 amps. per sq. ft. No. 1 solution gives initially a bright deposit which does not last; Nos. 2 and 3 give excellent coatings throughout the life of the bath. The deposits from Nos. 1 and 2 are metallic in appearance and behavior, but that from No. 3, although metallic in appearance is easily stripped from the electrode and the scales possess little mechanical strength, owing to the large quantity of gelatine which has been laid down with the silver. In spite of this, the No. 3 coating continues to be firm and bright and free from sludge as plating proceeds which is a desirable characteristic in silver recovery operations; occasionally, the deposit peels off in large flakes, but this introduces no serious filtering trouble.

Sometimes it is necessary to work with more concentrated thiosulfate than the 2% solutions described above, and to use an alum to prevent dissolution of too much gelatine if the bath is used photographically. A fixing bath which yields an excellent deposit and is satisfactory photographically consists of:

| | Parts |
|---|---|
| Sodium thiosulfate | 30,000 |
| Chrome alum | 2,000 |
| Sodium bisulfite | 500 |
| Activator | 5 |
| Water to | 100,000 |

The gelatine and silver accumulate naturally during the use of the bath photographically until they are present in sufficient concentration to give a good electrolytic deposit. Such a bath may be regenerated and used more than once, but it is best to add some activator before each electrolysis. By regeneration we mean that silver is removed from the solution and the fixing power of the bath is thus again restored. The electrolysis can be performed simply by using a graphite or noble metal anode and a silver, lead, tin, or graphite cathode. The anode may be in the main solution or secluded in a porous compartment containing an inert electrolyte.

We have found that the thiosulfate solution should preferably be kept acidic although it is possible to operate under certain conditions with a solution which is slightly alkaline. In other words, we have found that a thiosulfate solution having a hydrogen ion concentration of approximately pH—5 is preferable and that we may operate with a thiosulfate solution which has a hydrogen ion concentration between pH3.5 and pH9.

The description of the activating compounds which we have discovered are useful in our process will now be given in detail. The activators are, in general, substances which yield silver sulfide when mixed with a soluble silver salt, for example, silver nitrate, except that substances which are decomposed by thiosulfate during the time needed for a plating operation are excluded. Thus, thiourea which is a good plating activator yields silver sulfide with silver nitrate and is stable towards thiosulfate. Sodium trithionate, on the other hand cannot be used as a plating activator because although it reacts with silver nitrate it is not stable in thiosulfate solution and is, therefore, destroyed before it can perform its action. The activators which we have discovered have the power of forming silver halide complexes, which, under appropriate conditions, such as evidently exist at the cathode in the plating process just described, break down giving silver sulfide.

The thioureas with the grouping

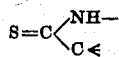

are all excellent activators. Typical members of the group are:

Thiourea 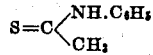

Thiocarbanilide 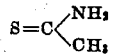

Thiosemicarbazide 

The isothiocyanates S=C=N— are as useful as the thioureas, typical members of this group being:

Ethyl isothiocyanate_____ S=C=N. C$_2$H$_5$
Allyl isothiocyanate_____ S=C=N. C$_3$H$_5$
Phenyl isothiocyanate_____ S=C=N. C$_6$H$_5$ which are all excellent plating activators.

Organic compounds with the nucleus

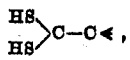

or with the tautomeric nucleus

—N=C—SH ⇌ NH—C=S

Examples are:
Potassium dithiocyanate yielding dithiocyanic acid in the two forms:—

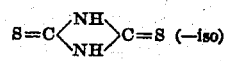 (—iso)

and

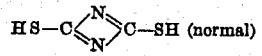 (normal)

Phenyl thiobiazolin sulfohydrate

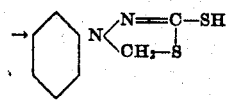

which is tautomeric with

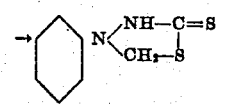

Compounds with the grouping

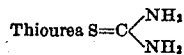

are reasonably good activators, for instance, thioacetanilide

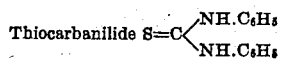

is good, while thioacetamide

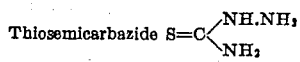

is fair.

For a compound to act as an activator it is necessary that it shall possess not only available sulfur, but that this sulfur shall be activated by special neighboring groups. These evidently, from the above examples, are provided by a neighboring sulphydryl radicle HS—, by one or two SO$_3$H— groups, by one or two NH— groups, or nitrile nitrogen. Accordingly, we should expect to find that compounds with available sulfur but no activating groups, having the nuclei

or

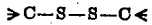

would fail to activate. This is the case, and compounds such as:

CS$_2$ carbon disulfide
C$_2$H$_5$—SH ethyl mercaptan
C$_6$H$_5$—S—C$_6$H$_5$ benzyl sulfide and C$_6$H$_5$—S—S—C$_6$H$_5$ dibenzyl disulfide are all inactive as plating activators. Dibenzyl sulfide actually hinders electroplating.

Now, the formula for thiosulfate or thiosulfurous acid may be written in two ways, and it is probable that in solution the material may exist in both modifications. They are:

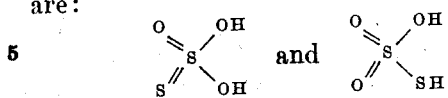

and it is evident that there is sufficient activating oxygen to render the bivalent sulfur available for sensitizing. However, the silver thiosulfate complex is so stable at ordinary temperatures that a thiosulfate-silver solution only activates at a high temperature where a little decomposition takes place. We must, therefore, add to the list of sensitizers hot thiosulfate and note that excellent plating can be obtained from thiosulfate solutions near their boiling point which contain gelatine but no added activator.

It will be noted that the activators all have this common property—that they can generate silver sulfide under certain appropriate conditions. Now, the ordinary thiosulfate plating bath also produces silver sulfide under most conditions; indeed, it is very difficult to obtain silver instead of sulfide at the cathode. The question involved for us to determine, therefore, was how a body which also generates silver sulfide can be useful in the thiosulfate plating bath.

It is well known that solid substances will not readily deposit from their super-saturated solutions unless a nucleus for deposition is presented. This nucleus may be a particle of like material, of nearly similar material, or on rare occasions of dissimilar material. A silver electrode suspended in a silver plating bath presents a large area of most active deposition nuclei for the reception of metallic silver. It is an area, however, which functions in a specially selective way. The silver depositing upon it is microcrystalline in structure, the surface gradually presenting myriads of contiguous crystal faces. The various faces continue to grow at individual rates appropriate to their particular axial habit with the result the electrode surface becomes rough and powdery. This is not objectionable in itself but it introduces the further complication that solution entrapped in the crystal interstices cannot readily be removed and the agitation which we have shown to be so vitally necessary to good plating cannot be secured. From a rough white character the deposit soon becomes black and powdery owing to the production of sulfide.

If we incorporate in the solution a material which would be absorbed uniformly over the silver electrode without limit or selection by the existing crystalline surface structure, and if this material would induce deposition of metallic silver, then the surface would be able to attract silver uniformly and smoothly. The surface would be continually inoculated for the reception of silver during the entire history of plating. Such a nucleating agent is silver sulfide. Silver sulfide has long been known for its power to induce precipitation of silver from super-saturated solutions. Thus, suspensions of the colloidal sulfide can induce precipitation of silver from solutions of a silver salt and a reducing agent which are otherwise comparatively stable. In the photographic "film" silver sulfide is the material that first induces development.

Now we have shown that silver-thiosulfate solutions can be adjusted so that an electric current produces chiefly silver sulfide at the cathode. The solution is then its own inoculating agent; but since there is produced nothing but silver sulfide, there is no silver available for deposition on the inoculated surface.

Similarly, the thiosulfate bath can be adjusted to produce cathodic silver without silver sulfide. Then we get silver plating but no inoculation and the plating continues but momentarily. The addition substances described in the present invention are all materials which form silver sulfide under conditions when the thiosulfate bath is producing silver. The thiosulfate bath gives the plating and the addition substances give the inoculation.

Although we have described our invention as being applicable to the plating out of silver from photographic fixing baths it will be understood that it has many other applications. For instance, scrap silver containing various impurities may be converted into a silver halide and the silver halide then dissolved in sodium thiosulfate solution from which the silver may be plated out in accordance with our invention. Similarly, other forms of silver, such as silver ores, silver sludges and various other chemical compounds of silver may be converted into silver halides which are dissolved in a thiosulfate solution from which the silver may be plated out in accordance with our invention.

The thiosulfate plating bath may be used in silver refining by making the crude silver the anode.

To recapitulate in a measure, we have discovered that metallic or semi-metallic silver may be electrolytically plated out or deposited from thiosulfate solutions containing it if there be added to the solution an activator which does not decompose the thiosulfate during the time needed for plating and which has the identifying faculty of yielding silver sulfide when mixed with silver nitrate. The activators discovered by us may also be identified as ones which possess available sulfur as well as special neighboring groups which in turn activate the sulfur, these groups being an HS group, one or two $HSO_3$ groups, one or two NH groups or nitrile nitrogen; the activator should not, of course, be decomposed by the thiosulfate. A further identifying feature of these activators is that they do not react with silver sodium thiosulfate to give silver sulfide in cold solution, namely, below about 15° C. Certain of these features are, of course, alternative or duplicate ones as will be understood from the foregoing specification.

Also from the foregoing it will be observed that those activators which we have discovered as being useful for activating silver plating solutions include in their chemical formula one of the groupings—

The thiourea class

The isothiocynate class

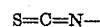

The thioamide class

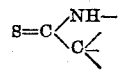

and

The dithio class

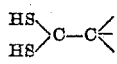

or

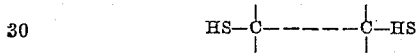

For hot silver plating solutions, i. e. between about 50° C. and 90° C. it may be found sufficient that the plating bath contain a compound having the grouping

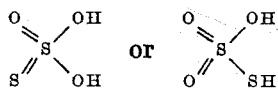

In either instance gelatine may or may not be present in the plating solution.

Also commercial gelatin often contains small quantities of complex sulfur bodies. Some gelatins contain much active sulfur and some contain very little. Those gelatins which contain appreciable quantities of mustard oils, thioureas, thio-imides or iso thiocyanates can, of course, act as composite plating activators, and any gelatin specially selected for its sulfur content and added to the thiosulfate bath to promote plating is considered as in the scope of this invention. In a like manner, natural essential oils of vegetable or animal origin containing activating bodies are considered within the scope of the invention.

Stating in another way, our invention comprises the addition of a compound capable of reacting with the silver-thiosulfate complex to yield traces of silver sulfide on the negative electrode of a thiosulfate plating bath under conditions when the thiosulfate itself is yielding silver at the negative electrode. It also comprises the special case when the silver thiosulfate solution is adjusted so that it is providing silver in bulk but sulfide in traces so small that it functions as its own inoculating agent.

It will be obvious to those skilled in this art that modification of our process may be resorted to within the spirit and scope of our invention as with an invention of the scope of this it is impossible without undue dissertation to set forth every minute detail of operation, condition or compound employed. The only limitations which we place on our invention, therefore, are those contained in the claims hereunto appended.

What we claim as our invention and desire to be secured by Letters Patent of the United States is:

1. A process for the deposition of silver which comprises electrolyzing a thiosulfate solution containing silver and an activator which includes in its chemical formula one of the groupings:

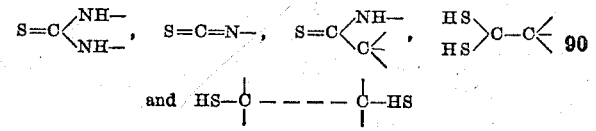

2. A process for the deposition of silver which comprises electrolyzing a thiosulfate solution containing silver, gelatine and an activator which includes in its chemical formula one of the groupings:

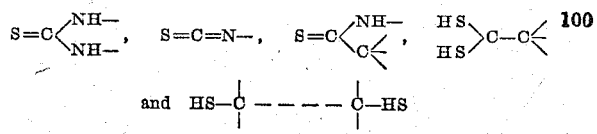

3. A process for the deposition of silver which comprises electrolyzing a thiosulfate solution containing silver and a small amount of an activator which includes in its chemical formula one of the groupings:

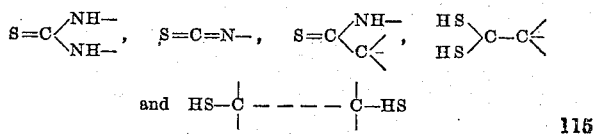

4. A process for the deposition of silver which comprises electrolyzing a thiosulfate solution containing silver, a relatively small amount of gelatine and approximately an equal amount of an activator which includes in its chemical formula one of the groupings:

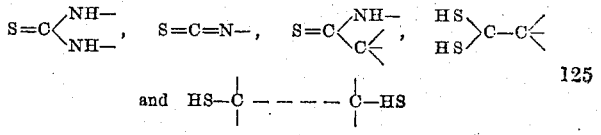

5. A process for the deposition of silver which comprises electrolyzing a thiosulfate solution containing silver and an activator which includes in its chemical formula the grouping:

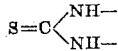

6. A process for the deposition of silver which comprises electrolyzing a thiosulfate solution containing silver, gelatine and an activator which includes in its chemical formula the grouping:

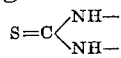

7. A process for the deposition of silver which comprises electrolyzing a thiosulfate solution containing silver and a small amount of an activator which includes in its chemical formula the grouping:

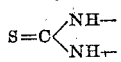

8. A process for the deposition of silver which comprises electrolyzing a thiosulfate solution containing silver, a relatively small amount of gelatine and approximately an equal amount of an activator which includes in its chemical formula the grouping:

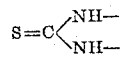

9. A process for the deposition of silver which comprises electrolyzing a thiosulfate solution containing silver and a small amount of thiourea.

10. A process for the deposition of silver which comprises electrolyzing a thiosulfate solution containing silver, a small amount of gelatine and approximately an equal amount of thiourea.

11. A process for the deposition of silver which comprises electrolyzing a thiosulfate solution having a hydrogen ion concentration between the limits of pH3.5 and pH9, and containing silver, a sulfite and an available-sulfur-containing-activator which will not be decomposed by the thiosulfate solution.

12. A process for the deposition of silver which comprises preparing a thiosulfate solution capable upon momentary electrolysis of producing a cathodic deposit of pure silver, adding thereto an available-sulfur-containing activator which will deposit during continuous electrolysis minute cathodic deposits of silver sulphide, and then electrolyzing that solution.

13. A process for the deposition of silver which comprises electrolyzing a thiosulfate solution having a hydrogen ion concentration between the limits of pH3.5 and pH9.0, and containing silver, a sulfite and an available-sulfur-containing-activator, which, during said electrolysis, yields minute cathodic deposits of silver sulphide.

14. A process for the deposition of silver which comprises electrolyzing a thiosulfate solution having a hydrogen ion concentration between the limits of pH3.5 and pH9.0, and containing silver, a sulfite and an activator, which includes in its chemical formula one of the groupings:

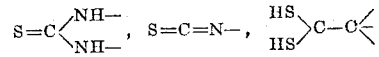

15. A process for the deposition of silver which comprises electrolyzing a thiosulfate solution having a hydrogen ion concentration between the limits of pH3.5 and pH9.0, and containing silver, a sulfite and an activator which includes in its chemical formula the grouping

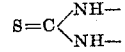

16. A process for the deposition of silver which comprises electrolyzing a thiosulfate solution having a hydrogen ion concentration between the limits of pH3.5 and pH9.0, and containing silver, a sulfite and thiourea.

17. A process for the deposition of silver which comprises electrolyzing an acidic thiosulfate solution containing silver, a sulfite and an available-sulfur-containing-activator which will not be decomposed by the thiosulfate solution.

18. A process for the deposition of silver which comprises electrolyzing an acidic thiosulfate solution containing silver, a sulfite and an available-sulfur-containing-activator, which, during said electrolysis, yields minute cathodic deposits of silver sulphide.

19. A process for the deposition of silver which comprises electrolyzing a thiosulfate solution having a hydrogen ion concentration between the limits of pH3.5 and pH9.0, and containing silver, a sulfite, gelatine, and an available-sulfur-containing-activator which will not be decomposed by the thiosulfate solution.

20. A process for the deposition of silver which comprises electrolyzing a thiosulfate solution having a hydrogen ion concentration between the limits of pH3.5 and pH9.0, and containing silver, a sulfite, gelatine, and an activator, which includes in its chemical formula one of the groupings:

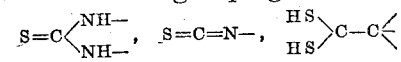

and 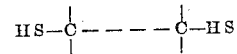

21. A process for the deposition of silver which comprises electrolyzing a thiosulfate solution having a hydrogen ion concentration between the limits of pH3.5 and pH9.0, and containing silver, a sulfite, gelatine, and thiourea.

22. A process for the deposition of silver which comprises electrolyzing an acidic thiosulfate solution containing silver, a sulfite, gelatine, and an available-sulfur-containing-activator which will not be decomposed by the thiosulfate solution.

23. A process for the deposition of silver which comprises electrolyzing a thiosulfate solution having a hydrogen ion concentration between the limits of pH3.5 and pH9.0 and containing silver, a sulfite and an available-sulfur-containing-activator which will not be decomposed by the thiosulfate solution.

24. A process for the deposition of silver which comprises preparing a thiosulfate solution capable, upon momentary electrolysis, of producing a cathodic deposit of pure silver, adding thereto an available-sulfur-containing-activator which will deposit during continuous electrolysis minute cathodic deposits of silver sulfide, and then electrolyzing that solution.

25. A process for the deposition of silver which comprises electrolyzing a thiosulfate solution having a hydrogen ion concentration between the limits of pH3.5 and pH9.0 and containing silver; a sulfite and an activator which, during said electrolysis, yields minute cathodic deposits of silver sulfide.

26. A process for the deposition of silver which comprises electrolyzing an acidic thiosulfate solution and containing silver, a sulfite and an activator which will not be decomposed by the thiosulfate solution.

27. A process for the deposition of silver which comprises electrolyzing an acidic thiosulfate solution and containing silver; a sulfite and an activator which, during said electrolysis, yields minute cathodic deposits of silver sulfide.

28. A process for the deposition of silver which comprises electrolyzing a thiosulfate solution containing silver and an activator which includes in its chemical formula the grouping:

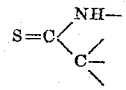

29. A process for the deposition of silver which comprises electrolyzing a thiosulfate solution containing silver, gelatine and an activator which includes in its chemical formula the grouping:

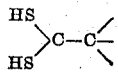

30. A process for the deposition of silver which comprises electrolyzing a thiosulfate solution containing silver and a small amount of an activator which includes in its chemical formula the grouping:

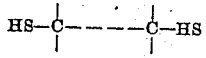

31. A process for the deposition of silver which comprises electrolyzing a thiosulfate solution containing silver, a relatively small amount of gelatine and approximately an equal amount of an activator which includes in its chemical formula the grouping:

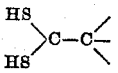

32. A process for the deposition of silver which comprises electrolyzing a thiosulfate solution containing silver and an activator which includes in its chemical formula the grouping:

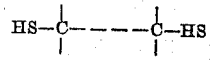

or its tautomer

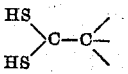

33. A process for the deposition of silver which comprises electrolyzing a thiosulfate solution containing silver, gelatine and an activator which includes in its chemical formula the grouping:

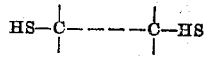

or its tautomer

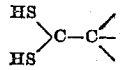

34. A process for the deposition of silver which comprises electrolyzing a thiosulfate solution containing silver and a small amount of an activator which includes in its chemical formula the grouping:

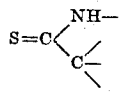

or its tautomer

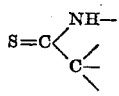

35. A process for the deposition of silver which comprises electrolyzing a thiosulfate solution containing silver, a relatively small amount of gelatine and approximately an equal amount of an activator which includes in its chemical formula grouping:

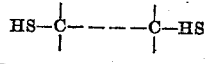

or its tautomer

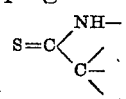

Signed at Rochester, New York, this 16th day of October, 1929.

KENNETH C. D. HICKMAN.
WALTER J. WEYERTS.